US006826491B2

(12) United States Patent
Jachim

(10) Patent No.: US 6,826,491 B2
(45) Date of Patent: Nov. 30, 2004

(54) METHOD AND APPARATUS FOR PROVIDING FILM STRESS MEASUREMENTS BASED ON SUBSTRATE DISPLACEMENT

(75) Inventor: Anton F. Jachim, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 535 days.

(21) Appl. No.: 09/907,353

(22) Filed: Jul. 17, 2001

(65) Prior Publication Data

US 2002/0066310 A1 Jun. 6, 2002

Related U.S. Application Data

(60) Provisional application No. 60/218,952, filed on Jul. 17, 2000.

(51) Int. Cl.[7] ................................................. G01I 1/00
(52) U.S. Cl. ............................. 702/42; 73/760; 73/789; 356/32
(58) Field of Search .............................. 702/42; 73/800, 73/150 A, 762, 794, 789, 760; 356/32, 301

(56) References Cited

U.S. PATENT DOCUMENTS

| | | | | |
|---|---|---|---|---|
| 4,812,036 A | * | 3/1989 | Inoue ........................... | 356/32 |
| 5,438,879 A | * | 8/1995 | Reda ............................ | 73/800 |
| 5,546,811 A | * | 8/1996 | Rogers et al. ................. | 73/800 |
| 6,050,138 A | * | 4/2000 | Lynch et al. ............... | 73/150 A |

OTHER PUBLICATIONS

Jachim, A., *Interpretation of Stresses in Thin Films from Wafer Shape*, Doctoral Dissertation, University of Wisconsin—Madison, 2001.

Cook, R., et al., *Advanced Mechanics of Materials*, Macmillan Publishing Co., New York, NY, 1985.

Cook, R., et al., *Concepts and Applications of Finite Element Analysis, Third Edition*, John Wiley & Sons, New York, NY, 1989.

Strang, G., *Introduction to Applied Mathematics*, Wellesley–Cambridge Press, Wellesley, MA, 1986.

Madou, M., *Fundamentals of Microfabrication*, CRC Press LLC, Boca Raton, FL, 1997.

Jachim A., et al., "Mechanical Modeling of (110) EPL Masks," *Proceedings of TECHCON*, 2000.

Wortman, J., et al., "Young's Modulus, Shear Modulus, and Poisson's Ratio in Silicon and Germanium," *Journal of Applied Physics*, vol. 36, No. 1, Jan., 1965.

Brantley, W., "Calculated Elastic Constants for Stress Problems Associated with Semiconductor Devices," *Journal of Applied Physics*, vol. 44, No. 1, 1973.

(List continued on next page.)

*Primary Examiner*—John Barlow
*Assistant Examiner*—Hien Vo
(74) *Attorney, Agent, or Firm*—Moore & Van Allen PLLC; Steven B. Phillips

(57) ABSTRACT

Method and apparatus for providing film stress measurements. The invention provides a method for calculating film stress based on an inverse finite element analysis of a displaced substrate such as a semiconductor wafer. The surface displacement of the substrate is measured, and structural compliance based on an inverse finite element model of the substrate is determined. A stress field is ultimately calculated based on the structural compliance and a stress-load. The stress measurement is output based on values in the stress field. The invention can be implemented in software running on a computer system interfaced to a measurement system such as a stress and flatness gauge.

43 Claims, 5 Drawing Sheets

OTHER PUBLICATIONS

Glang, R., et al., "Determination of Stress in Films on Single Crystalline Silicon Substrates," *The Review of Scientific Instruments*, vol. 36, No. 1, Jan., 1965.

Nakagiri, S, et al., "Finite Element Interval Analysis of External Loads Identified by Displacement Input with Uncertainty," *Computational Meth. in Applied Mechanics and Eng.*, No. 168, 1999.

Gao, Z., et al., "On the Inversion of Residual Stresses from Surface Displacements," *Journal of Applied Mechanics*, vol. 56, Sep., 1989.

Timoshenko, S., et al., *Theory of Plates and Shells*, McGraw-Hill, New York, 1959.

Nye, J., *Physical Properties of Crystals*, Oxford at the Clarendon Press, London, 1957.

* cited by examiner

METHOD AND APPARATUS FOR PROVIDING FILM STRESS MEASUREMENTS BASED ON SUBSTRATE DISPLACEMENT

CROSS-REFERENCE TO RELATED APPLICATION

This application claims priority from provisional patent application Ser. number 60/218,952, filed Jul. 17, 2000 by the inventor hereof, the entire disclosure of which is incorporated herein by reference.

FEDERALLY SPONSORED RESEARCH

This invention was made with Government support under a grant identified by Agency Number DAAD-17-99-C-0085, awarded by the U.S. Department of Defense. The Government has certain rights in this invention.

BACKGROUND

The manufacturing of semiconductor devices typically begins with a wafer of single crystal silicon and consists of three basic processes: doping, depositing or growing of thin films, and film patterning. The thin films are typically less than one micrometer thick. The thin films may be deposited on the surface of the wafer by sputtering or evaporation, or they may be grown by placing the wafer in a reactive environment. These thin films may be conductive materials, such as aluminum, tungsten, or polysilicon, or insulating materials, such as silicon nitride or silicon dioxide. The conductive films form device gates or interconnects, and the insulating films provide electrical isolation.

The thin films applied in the course of semiconductor manufacturing nearly always exhibit some intrinsic stress. This stress may be attributed to the mismatch of the thermal expansion coefficients of the crystal lattices of the film and substrate wafer, as well as other mechanisms. If these stresses are not controlled, they can lead to failure of electronic devices by a variety of mechanisms, including film cracking, delamination, and void formation. To some extent, film stress may be controlled during deposition or growth by process variation or afterward by annealing. But in order to accurately control film stress, the stress must be accurately measured.

Over the years, a wide variety of methods for measuring stress in thin films has emerged. These methods include X-ray diffraction of the film, micro-Raman spectroscopy of the film, use of micro-mechanical structures printed into the film, membrane resonant frequency measurement, and pressure bulge inducement. A very common technique for determining thin film stress in the semiconductor industry is the wafer curvature technique.

In order to determine film stress from wafer curvature, the out-of-plane distortion of the wafer must be measured. This measurement may be accomplished by several methods, including X-ray diffraction of the wafer (rather than the film), micro-Raman spectroscopy applied to the wafer, interferometry, capacitance gauging, profilometry, and laser scanning. As an example, a typical laser scanning technique is illustrated in FIG. 1. A diode laser, 101, generates a laser beam that is passed through lens 102, and scans across the wafer with the film, 103. The beam reflects off the wafer and is reflected by mirror 104 to a photodetector 105. The angle at which the beam is reflected is sensed and recorded. The angle is related to the rotation of the wafer's surface. The measurement is typically repeated across several diameters of the wafer. The apparatus shown in FIG. 1 is typically embodied in a "stress and flatness gauge" such as the model FSM 128 Stress and Flatness Gauge manufactured by Frontier Semiconductor Measurements, Inc., of San Jose, Calif. Such an instrument is typically connected to a computer system, which determines the stress and displays a graphical stress map or other type of graphical display illustrating stresses across the film.

The stress on a film stretched across a wafer is currently computed in the above-described and similar arrangements by the following equation, commonly known in the industry as "Stoney's equation":

$$\frac{\partial^2 w}{\partial y^2} = \frac{\partial^2 w}{\partial x^2} = \frac{6\sigma_f t_f (i-v)}{E t_s^2},$$

where: $\sigma_f$=film stress
$t_f$=film thickness
$t_s$=substrate thickness
$v$=Poisson's ratio of substrate
$E$=elastic modulus of substrate
$w$=out-of-plane displacement.

Although using this equation to compute film stress provides useful, qualitative information about the stress, the quantitative accuracy of film stresses determined with Stoney's equation is severely limited. Stoney's equation was derived using the assumption that the film stress is constant across the wafer. This assumption is often invalid as film stress usually varies across the wafer. A new technique for determining film stress from out-of-plane distortion of a substrate is needed to take varying film stress into account, and thus improve the accuracy of film stress measurements.

SUMMARY

The present invention provides a method for calculating film stress based on an inverse finite element analysis of the displaced substrate wafer. The method of the invention produces accurate results regardless of whether film stress is constant across the wafer. The method can be employed with any system that measures substrate curvature and is not limited to the laser scanning system previously described.

In one embodiment, a stress measurement for a film applied to a substrate having known dimensions and known structural properties is made by first measuring the surface displacement of the wafer, and then determining structural compliance based on an inverse finite element model of the substrate, and structural stress-load using the known dimensions and known structural properties of the substrate. A stress field is calculated using the structural compliance, the structural stress-load, and the surface displacement of the substrate. The stress measurement is output based on values in the stress field. The structural compliance can be determined by calculating a stiffness, inverting the stiffness matrix, and removing columns corresponding to unloaded degrees of freedom and rows corresponding to unprescribed displacements. The structural stress-load can be determined by calculating element-by-element stress-loads as matrixes and expanding them.

In other embodiments, iteration is added to the method to further improve accuracy in some situations. Iteration can be added to the method by calculating surface loads based on the structural compliance, iteratively correcting the surface loads to arrive at final surface loads, and using the surface loads to calculate the stress field. In this case, the final surface load is eventually determined by determining a residual surface load at each iteration.

Iteration can also be added to the method of the invention by iteratively correcting coefficients in the stress field. In this embodiment, an initial stress field is calculated as described above, and the stress field coefficients are iteratively corrected until a final stress field is determined.

In example embodiments of the invention, computer software is used to implement many aspects of the invention. The software can be stored on a medium. The medium can be magnetic, such as a diskette, tape, or fixed disk, or optical, such as a CD-ROM or DVD-ROM. The software can also be stored in a semiconductor device. Additionally, the software can be supplied via the Internet or some other type of network. A workstation or computer system that typically runs the software. In one embodiment, this computer system, also called a "program execution system" is interfaced to a measurement system such as the Stress and Flatness Gauge previously described. The software in combination with the computer system and measurement system forms the means to execute the method of the invention.

DETAILED DESCRIPTION OF ONE OR MORE EMBODIMENTS

Figure 1:
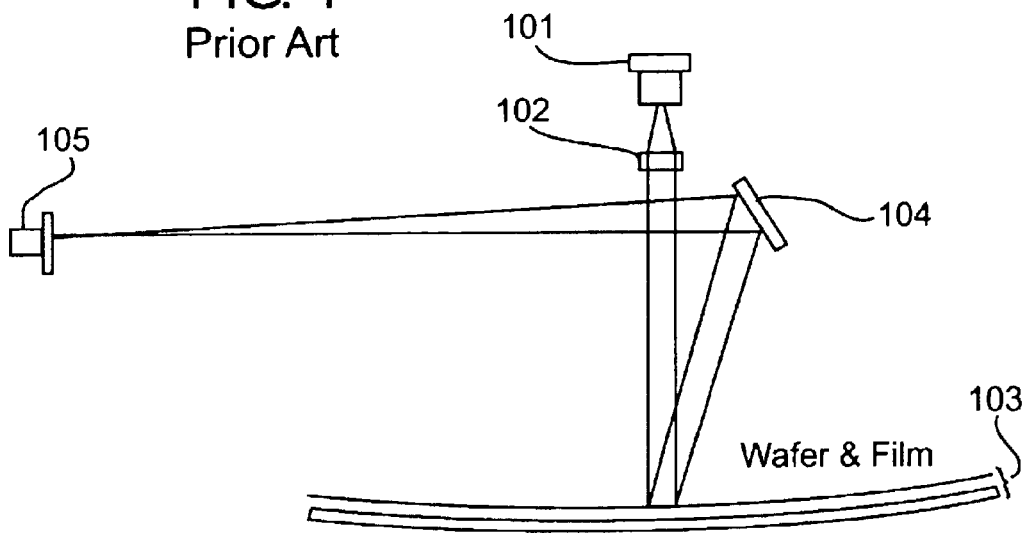
FIG. 1 illustrates a known stress and flatness gauge that can be used to make wafer displacement measurements.

The invention will now be described in terms of specific embodiments. This embodiments are in general shown as examples only. For example, the invention is described in terms of using a laser scanning stress and flatness gauge to make wafer displacement measurements; however, any measurement system that measures displacement can be used with the invention. It is also assumed that the measurement system and a program execution system operable to control the measurement system are separate units connected together. However, these two systems can be enclosed in one unit, with the program execution system and possibly a display to show stress maps integrated together with the measurement system.

Similarly, some terminology is used primarily for illustrative purposes, and may not be important to the workings of the invention. For example, the words substrate and wafer are used interchangeably herein. The technique may work with substrates other than semiconductor wafers per se. The specific application example used to illustrate the invention, that of films applied to semiconductor wafers, results in the use of the term wafer at some points, but this is not intended to limit the application of the invention to semiconductor wafers. Although films in semiconductor applications are generally thin as previously mentioned, the application of the invention is not intended to be limited to films of any specific thickness. Also, the detailed embodiments are mostly described in terms of matrixes, such as stress-load matrixes and a stress field matrix; however, the adjectives from these and similar phrases are also used independently from the term "matrix." Such terms as "stress field" and "stress-load" or "structural compliance" used by themselves may refer to a matrix, but are also intended to recognize the fact that some numerical representations other than a matrix per se may be possible for at least some of these values or groups of values.

Finally, various adjectives may be used to modify terms referring to specific types of matrixes or quantities, for example "stress-load matrix" and "structural stress-load matrix" refer to the same type of matrix or value, but may be used to distinguish a matrix or value at different points in a calculation process, or to refer to a matrix or value describing the entire substrate as opposed to one describing only a portion of a substrate. The same applies when the terms "final" and/or "initial" are used, as well as whether or not the term "matrix" is used.

As previously mentioned, the invention uses an inverse finite element model to calculate film stress. In order to understand the inverse finite element model used in the example embodiments of the invention, it is necessary to understand the "forward" finite element model on which the inverse model is based. It is also desirable to use an accurate forward finite element model to implement the invention, since any inaccuracies in the forward model will be reflected in the inverse model.

Displacement-based finite element models solve an equation like that shown below, for $\{x\}$, a given structural loading, $\{F\}$ and the structural stiffness matrix $[K]$. The structural stiffness matrix is assembled by adding individual element stiffness matrices.

$$[K]\{x\}=\{F\}$$

In order to model a wafer substrate and thin film, two element types are required; three-dimensional solid elements for the wafer and two-dimensional plane elements for the film. For both plane and solid elements, isoparametric linear and quadratic Lagrange elements have been devised and tested. The quadratic Lagrange elements have been found to work well. The procedure for element construction described herein will be limited to quadratic plane elements. This procedure is readily extended to the three-dimensional quadratic solid elements, or linear elements.

In general, plane quadratic Lagrange elements have 9 nodes and, in global (x, y) coordinates, curved sides. In order to facilitate numerical integration, these elements are reinterpreted in computational $(\xi, \eta)$ space square elements. Translation between (x, y) and $(\xi, \eta)$ space is achieved by the first of the following equations, where $\{x_i, y_i\}$ are nodal locations in (x, y) space, and $N_i$ are the second order Lagrange interpolation shape functions given in the next two equations evaluated at nodal locations in $(\xi, \eta)$ space.

$$\begin{Bmatrix} x \\ y \end{Bmatrix} = \begin{bmatrix} x_1 & x_2 & x_3 & \ldots & x_9 \\ y_1 & y_2 & y_2 & \ldots & y_9 \end{bmatrix} \begin{Bmatrix} N_1 \\ N_2 \\ N_3 \\ \vdots \\ N_9 \end{Bmatrix}$$

$$N(x) = \frac{(x_1 - x)(x_2 - x)(x_3 - x)}{(x_1 - x_3)(x_2 - x_3)}$$

$$N_i = N(\epsilon_i) N(\eta_i)$$

Displacement-based finite elements are used to calculate nodal displacements from nodal loads by:

$$[k_e]\{x_e\}=\{f_e\},$$

where $[k_e]$ is the element stiffness matrix and $\{f_e\}$ are the element nodal loads. For these elements, the element stiffness matrix is calculated by 3×3 Gauss quadrature numerical integration of the following equation, where $[J]$ is the Jacobian transformation between $(x, y)$ and $(\xi, \eta)$ space given by the next three equations, $t_f$ is the film thickness and $[E]$ is the film (plane stress) constitutive matrix. The subscripts following commas in the last equation denote partial derivatives.

$$[K_e] = \int_{-1}^{1}\int_{-1}^{1} [b_e]^T [E][b_e] t_f J d\xi d\eta$$

$$J = \det[J]$$

$$[J] = [D_N]\begin{bmatrix} x_1 & y_1 \\ x_2 & y_2 \\ \vdots & \vdots \\ x_9 & y_9 \end{bmatrix}$$

$$[D_N] = \begin{bmatrix} N_{1,\xi} & N_{2,\xi} & \cdots & N_{9,\xi} \\ N_{1,\eta} & N_{2,\eta} & \cdots & N_{9,\eta} \end{bmatrix}$$

The matrix $[b_e]$ is the strain-displacement matrix given by the following two equations, which interpolates the strain field, $\{\epsilon_x, \epsilon_y, \gamma_{xy}\}$, from the nodal displacements $\{u_i, v_i\}$ (as shown in the third equation, below.

$$b_e = \begin{bmatrix} \Gamma_{11} & \Gamma_{12} & 0 & 0 \\ 0 & 0 & \Gamma_{21} & \Gamma_{22} \\ \Gamma_{21} & \Gamma_{22} & \Gamma_{11} & \Gamma_{12} \end{bmatrix} \begin{bmatrix} N_{1,\xi} & 0 & N_{2,\xi} & 0 & \cdots & 0 \\ N_{1,\eta} & 0 & N_{2,\eta} & 0 & \cdots & 0 \\ 0 & N_{1,\xi} & 0 & N_{2,\xi} & \cdots & N_{9,\xi} \\ 0 & N_{1,\eta} & 0 & N_{2,\eta} & \cdots & N_{9,\eta} \end{bmatrix}$$

$$[\Gamma] = [J]^{-1}$$

$$\begin{Bmatrix} \epsilon_x \\ \epsilon_y \\ \gamma_{xy} \end{Bmatrix} = [b_e] \begin{Bmatrix} u_1 \\ v_1 \\ u_2 \\ v_2 \\ \vdots \\ u_9 \\ v_9 \end{Bmatrix}$$

It should be noted that the 3×3 or 3×3×3 Gauss quadrature numerical integration is used herein as an example only. Any integration scheme of equal or higher accuracy can be employed.

Single crystal silicon (SCS) is the most common substrate material for semiconductor devices. Silicon crystals have the form of a cubic "diamond" lattice as. Miller indices are used to identify directions within the SCS lattice. In this discussion, the Miller indices in parentheses, e.g., (110), indicate corresponding crystal planes, and those contained in brackets, e.g., [110], refer to direction vectors.

The cubic lattice structure of SCS causes it to exhibit orthotropic elastic properties. In many analyses incorporating the mechanical behavior of bulk silicon, orthotropic material properties of SCS are ignored, and the material is treated as isotropic. Under many circumstances this approximation is reasonable; however, in some situations the material anisotropy plays a major role in mechanical response. In current instruments based on Stoney's equation, the orthotropic material properties of SCS are not considered. Rather, approximate isotropic material properties are used. The orthotropic properties of SCS can be readily incorporated into a finite element solid model and, therefore, into an inverse finite element model stress measurement method as well.

The elastic properties of any diamond lattice crystalline material can be fully described by three independent coefficients: $s_{11}$, $s_{12}$, and $s_{44}$ arranged in the compliance matrix s shown in the equation below.

$$s = \begin{bmatrix} s_{11} & s_{12} & s_{12} & 0 & 0 & 0 \\ s_{12} & s_{11} & s_{12} & 0 & 0 & 0 \\ s_{12} & s_{12} & s_{11} & 0 & 0 & 0 \\ 0 & 0 & 0 & s_{44} & 0 & 0 \\ 0 & 0 & 0 & 0 & s_{44} & 0 \\ 0 & 0 & 0 & 0 & 0 & s_{44} \end{bmatrix}$$

The values of the compliance matrix for SCS are given in the following table, in units of $10^{-12}$ cm$^2$/dyn.

| s11 | s12 | s44 |
| --- | --- | --- |
| 0.768 | −0.214 | 1.26 |

An isotropic material has only two independent elastic material properites. These are usually given as the elastic modulus (E) and Poisson's ratio (v). With three independent elastic material properties, the elastic modulus and Poisson's ratio of SCS depend on direction. This directional dependence is given by the following two equations, where $I_1$, $I_2$ and $I_3$ are the components of a unit direction vector and $m_1$, $m_2$, and $m_3$ are components of a unit vector perpendicular to I.

$$1/E = s_{11} - 2(s_{11} - s_{12} - 1/2 s_{44})(l_1^2 l_2^2 + l_2^2 l_3^2 + l_1^2 l_3^2)$$

$$v = -\frac{s_{12} + (s_{11} - s_{12} - 1/2 s_{44})(l_1^2 m_1^2 + l_2^2 m_2^2 + l_3^2 m_3^2)}{s_{11} - 2(s_{11} - s_{12} - 1/2 s_{44})(l_1^2 l_2^2 + l_2^2 l_3^2 + l_1^2 l_3^2)}$$

Most SCS wafers used in semiconductor manufacturing or advanced lithographic masks are cut to form a (100) plane. However, for some devices a (110) wafer may be preferred. The bending behaviors of these two wafer types differ substantially. The (100) wafers often tend to behave much like an isotropic material, and (110) wafers show significant orthotropy in most cases. If the unit direction vectors I and m are restricted to the (100) plane, the above equations become the following equations.

$$1/E_{(100)} = s_{11} - 2(s_{11} - s_{12} - 1/2 s_{44}) l_2^2 l_3^2$$

$$v_{(100)} = -\frac{s_{12} + 2(s_{11} - s_{12} - 1/2 s_{44}) l_2 l_3 m_2 m_3}{s_{11} - 2(s_{11} - s_{12} - 1/2 s_{44}) l_2^2 l_3^2}$$

Although the elastic modulus and Poisson's ratio vary substantially within the (100) plane, the bending of a wafer substrate by uniform biaxial loading depends on the biaxial modulus of the substrate material. In the case of a (100) SCS wafer, the biaxial modulus is constant. Since the biaxial modulus of SCS does not vary within the (100) plane, (100) SCS wafers behave as if isotropic when bent out of plane by uniform biaxial loading.

In some instances, properties of (110) SCS wafers may be desired for processing reasons. If the unit direction vectors l and m are restricted to the (110) plane, the variation of the elastic modulus and Poisson's ratio of SCS within the (110) plane is given by the following equations.

$$1/E_{(110)} = s_{11} - 2(s_{11} - s_{12} - 1/2s_{44})l_1^2(2 - 3l_1^2)$$

$$v_{(110)} = -1 \frac{s_{12} + (s_{11} - s_{12} - 1/2s_{44})(6l_1^2 m_1^2 - 2l_1^2 - 2m_1^2 + 1)}{s_{11} - 2(s_{11} - s_{12} - 1/2s_{44})l_1^2(2 - 3l_1^2)}$$

Bending under uniform biaxial load depends on the biaxial modulus of the wafer. Unlike (100) SCS, the biaxial modulus of (110) SCS, given by the following equation, is dependent on the direction of the plane.

$$\left(\frac{E}{1-v}\right)_{(110)} = \frac{2s_{44}}{((4s_{11}s_{44} + 6l_1^4 - 1) + 6l_1^2(m_1^2 - 1) - 2m_1^2)} (2s_{11}s_{44} - 2s_{12}s_{44} - 1)$$

Since the biaxial modulus of (110) SCS is anisotropic, a (110) wafer substrate will bend in an anisotropic manner, even under a uniform biaxial load.

Both the solid substrate and the plane film must be broken into element meshes in order to solve the displacement problem. Any arrangement of meshes can be used. For this example embodiment, a round substrate is created by dividing the disk model into radial slices and circumferential rings. To accomplish this, wedge-shaped "degenerate" elements are used at the center of the disk. For both round and square substrates, three layers of nodes are used through the thickness, one layer at the top surface, one at the bottom, and one layer at the neutral surface (⅙ of the substrate thickness below the mid-plane.) These three layers of nodes allow a mesh of one quadratic element through the substrate thickness. The structural stiffness matrix is assembled by calculating individual element stiffness matrices and by adding the element stiffness matrix entries into the corresponding structural stiffness matrix locations according to the following equation.

$$[K] = \sum_n^{elements} [k_e]_n$$

In order to determine wafer displacements, which result from intrinsic film stress, it is necessary to calculate the distributed nodal loads which approximate the film stress. This calculation is accomplished within an element by 3×3 Gauss quadrature integration of the following equation, where $\{f_e\}$ is the element nodal load vector, $\{\sigma_0\}$ is the initial stress and $[b_e]$, t, and J are as previously defined.

$$\{f_e\} = -\int_{-1}^{1}\int_{-1}^{1} [b_e]^T \{\sigma_0\} t_f J d\xi d\eta$$

Like the element stiffness matrices, the element load vectors are expanded into a structural load vector by taking the load for each element node and adding that load to the corresponding structural DOF. This procedure is represented by the following equation.

$$\{F\} = \sum_n^{elements} [f_e]_n$$

Figure 2:
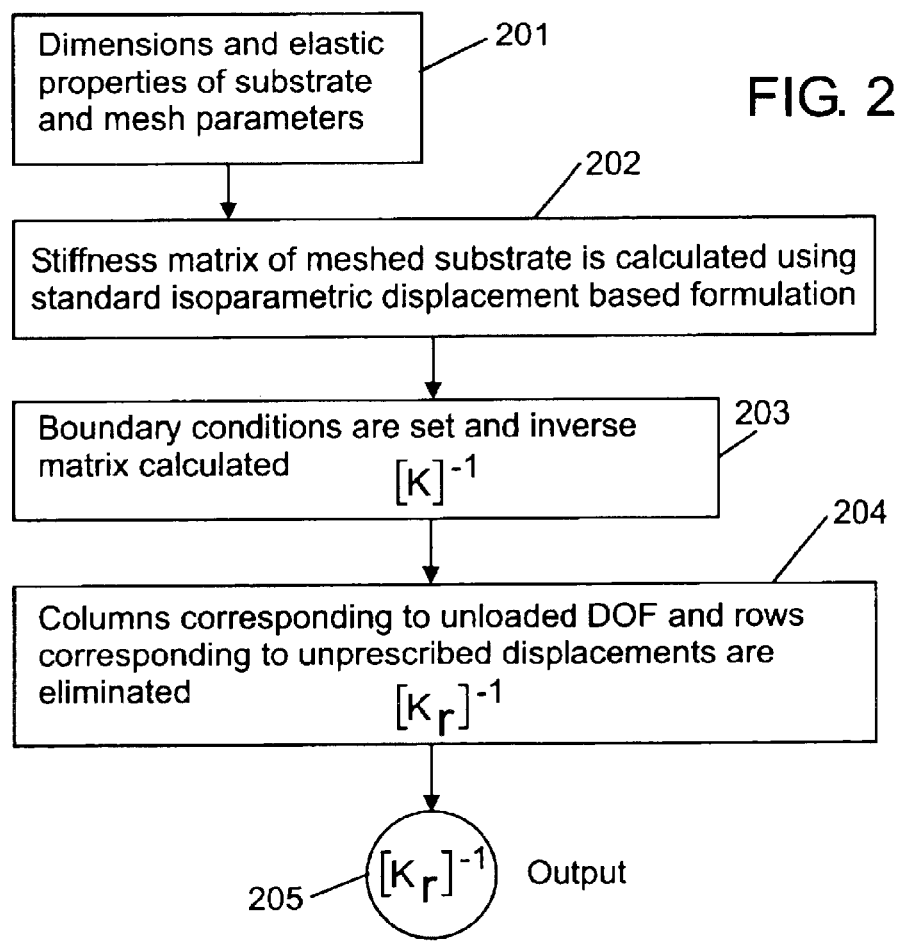
FIG. 2 is a flowchart that illustrates how the structural compliance is calculated according to one embodiment of the invention.

FIG. 2 illustrates how structural compliance matrix is calculated by inverting the structural stiffness matrix discussed here. The structural stiffness matrix is calculated in the first part of the flowchart. Dimensions, elastic properties, and mesh parameters for the substrate are input at step 201. The structural stiffness matrix is calculated at step 202, using the isoparametric displacement-based formulation previously described. With the nodal loads for a particular state of film stress calculated and the structural stiffness matrix assembled, boundary conditions are then set initially in step 203 in order to prevent rigid body motion, removing the singularities from [K] (making [K] invertable). In each case, 6 rigid body motions must be restrained, and 6 degrees of freedom (DOF) are fixed to accomplish this. At the center of the neutral and bottom surfaces of the wafer, the x and y displacements are fixed, restricting in-plane translation and rotation about the x and y axes. An additional in-plane DOF is fixed at the neutral surface to prevent rotation about the z axis, and the central out-of-plane DOF is fixed at the top surface to prevent translation in the z direction. The boundary conditions are set by zeroing the rows and columns of [K] and the entries in [F] which correspond to the structural DOF being deactivated.

In the inverse finite element approach that is characteristic of the invention, a three-dimensional structural stiffness matrix is assembled for the wafer. The film is assumed to be very thin and to contribute no significant stiffness to the structure, so no stiffness matrix is assembled for the film. However, another matrix for the film, called the "stress-load matrix" in subsequent sections, will be needed in order to determine film stress from structural loading; this matrix is assembled at this time. With rigid body motion constrained by the boundary conditions, the wafer stiffness matrix is inverted. Unloaded DOF are now removed, producing a reduced stiffness matrix and a reduced load vector. The problem of determining structural loads from wafer shape is under-prescribed. Several plate-bending assumptions are applied as displacement constraints. These constraints over-prescribe the problem and allow for an approximate solution.

Two alternative approaches can be used in determining the stress field matrix. The first, called the "load correction method" in subsequent sections, uses the reduced stiffness matrix in a least squares fit to calculate approximate structural loading. The loads can then be used to calculate approximate film stress field by least squares fit with the stress-load matrix. In the second approach, called the "stress correction method" in subsequent sections, a single least squares fit of both the reduced stiffness matrix and the stress-load matrix produces an approximate stress field for the film. Either approach results in a structural stress field determined using the structural compliance matrix, and, at least in part a structural stress-load matrix. The results from either method may be improved by calculating wafer displacements based on the computed stress or load results, calculating the difference between the computed and measured surfaces, and repeating the solution process iteratively on the difference surface.

Typically, FEM is used to determine displacements and stresses in a structure subject to a known load. However, it is also possible to determine input forces from known displacements. If all nodal displacements, {x}, are known, solving for the applied forces, {F}, is a simple matter. The problem can be solved by the following equation. The structural stiffness matrix is singular, but if enough DOF are removed to prevent rigid body motion, as previously described, then the matrix is no longer singular. Returning to FIG. 2, the matrix is inverted at step 203 after the boundary conditions are set to create the structural compliance matrix, $[K]^{-1}$ shown in the following equation.

$$[K]^{-1}\{F_{(inv)}\} = \{x\}$$

Assuming that wafer surface height has been experimentally determined at the nodal locations, nodal displacements are known and nodal forces are sought. In particular, out-of-plane nodal displacements for the solid model surface are known and in-plane nodal forces for the solid model surface are sought. Once the in-plane solid model forces are determined, they can be used to determine intrinsic membrane stress.

When solving the above equation for nodal forces, it is important to note that the only in-plane loading on the top surface of the model is allowed. Columns and rows can be removed from the matrix at step 204 of FIG. 2. By the nature of the problem, nodal forces associated with all other DOF must be zero. This observation simplifies the equation dramatically. All of the columns of $[K]^{-1}$ not associated with DOF in the plane of the top surface can be removed, and {F} can be reduced to include only in-plane DOF. The only rows of $[K]^{-1}$ that contribute to the solution are those corresponding to known displacements in {x}; all other rows and corresponding entries in {x} can be eliminated. The problem has been reduced to unknown surface forces and known out-of-plane surface displacements as shown in the following equation.

$$[K_r]^{-1}\{F_{r(inv)}\} = \{x_r\}$$

Only the out-of-plane displacements in the top surface are known, one at each node, but two nodal forces are sought at each node. The problem is therefore under prescribed, and in general has no unique solution. However, if the solid is assumed to behave as a mechanical plate, additional DOF can be prescribed. The neutral plane of a plate bent by a tensile membrane on its surface should be located ⅙ of the plate's thickness below the midsurface; there should be no distortion within this plane. Accordingly, if it is assumed that the neutral plane of the solid does not deform in-plane, then the corresponding DOF can be prescribed to be zero. In addition, since the solid structure is quite thin, it is reasonable to assume that the out-of-plane displacements of the neutral and bottom surfaces will closely follow those of the top surface. With these additional prescribed DOF, the reduced compliance matrix in the above equation now has five times as many columns as the mesh has surface nodes. That is, the equation has five known DOF for every two unknown forces. The equation is now over-prescribed. In general, there will be no exact solution to this set of equations. However, an approximate solution to the equation can be found by least squares fit, as shown below.

$$\{F_{r(inv)}\} = \left[\left[[K_r]^{-1}\right]^T [K_r]^{-1}\right]^{-1}\left[[K_r]^{-1}\right]^T \{x_r\}.$$

Once these approximate loads have been calculated, the structural compliance matrix is output from this process at step 205 of FIG. 2, and can be applied to the film model and film stress can determined.

Solving a displacement FEM problem with initial stress, $\sigma_0$, requires calculating the initial element loads as shown in the first of the two equations below. The loads on individual elements would then be added into the structural load vector for the corresponding DOF, as shown in the second equation, previously discussed.

$$\{f_e\} = -\int_{-1}^{1}\int_{-1}^{1}[b_e]^T\{\sigma_0\}t_f J d\xi d\eta$$

$$\{F\} = \sum_{n}^{elements}[f_e]_n$$

With the structural loads established, the displacements can be calculated as previously discussed. The resulting stresses (in the film and substrate) could then be calculated for each element by the first of the following equations. In this equation, the first term on the left side is commonly referred to as the stress due to deformation. In practice, it is found that the relatively thick substrate prevents significant in-plane deformation of the thin film attached to it. Based on this observation, the stress due to deformation in the film may be assumed to be small, relative to the initial stress. With this assumption, the film stress is approximately equal to the initial stress, as shown in the second equation.

$$\{\sigma_e\} = [E][b_e]\{x_e\} + \{\sigma_0\}$$

$$\{\sigma_e\} \sigma \{\sigma_0\}$$

The result of the inverse calculations previously discussed was an approximation of the load on the surface of the wafer. By the equation immediately above, it can be assumed that this loading is derived from initial stress. Therefore, determining film stress from the loads calculated by the inverse model requires reversing the integration of the following equation, which was previously discussed.

$$\{f_e\} = -\int_{-1}^{1}\int_{-1}^{1}[b_e]^T\{\sigma_0\}t_f J d\xi d\eta$$

Reversing the integration of this equation in order to determine the corresponding film stress for the calculated loads presents two challenges. The first challenge is inverting the integration of the equation. The second challenge is that the loading is known only for the entire film structural model, not for individual elements.

If element, rather than structural, loads were given by the inverse computation (ignoring the second challenge), it could be assumed that the element loads were the result of initial loading as shown by the first equation, below. In order to extract the initial stress from the integration of that equation, it is useful to assume that the initial stress has the form of the second equation below, where [p] is a matrix of shape functions and {c} is a vector of coefficients.

$$\{f_{e(inv)}\} = -\int_{-1}^{1}\int_{-1}^{1}[b_e]^T\{\sigma_0\}t_f J d\xi d\eta$$

$$\sigma_0 = [p]\{c\}$$

With the stress field assumed to have the form of the equation above, the coefficient vector {c} is dependent on the load case, but is independent of the variables of integration and can be removed from the integral, as shown in the first of the next two equations. The resulting integral depends only on the element shape and choice of stress field shape functions, and not on a particular load case. Since this integral problem is independent of load case, it can be calculated for each element as the stress-load matrix $[a_e]$, shown in the second equation, and applied to any load case.

$$\{f_{e(inv)}\} = \int_{-1}^{1}\int_{-1}^{1} [b_e]^T [p] t_f J d\xi d\eta \{c\}$$

$$[\alpha_e] = \int_{-1}^{1}\int_{-1}^{1} [b_e]^T [p] t_f J d\xi d\eta$$

An convenient set of shape functions, which adequately represents the anticipated stress patterns may be chosed for $[p]$. The following equations illustrate an arbitrary order two-dimensional polunominal field of biaxial stress. This is an isotropic stress field used as an example. An anisotropic can be used as well.

$$c = \begin{Bmatrix} c_1 \\ c_2 \\ \vdots \\ c_{\sum_{l}^{n+1} i} \end{Bmatrix}$$

$$p = \begin{bmatrix} 1 & x & y & xy & x^2 & y^2 & \ldots & y^n \\ 1 & x & y & xy & x^2 & y^2 & \ldots & y^n \\ 0 & 0 & 0 & 0 & 0 & 0 & \ldots & 0 \end{bmatrix}$$

Figure 3:
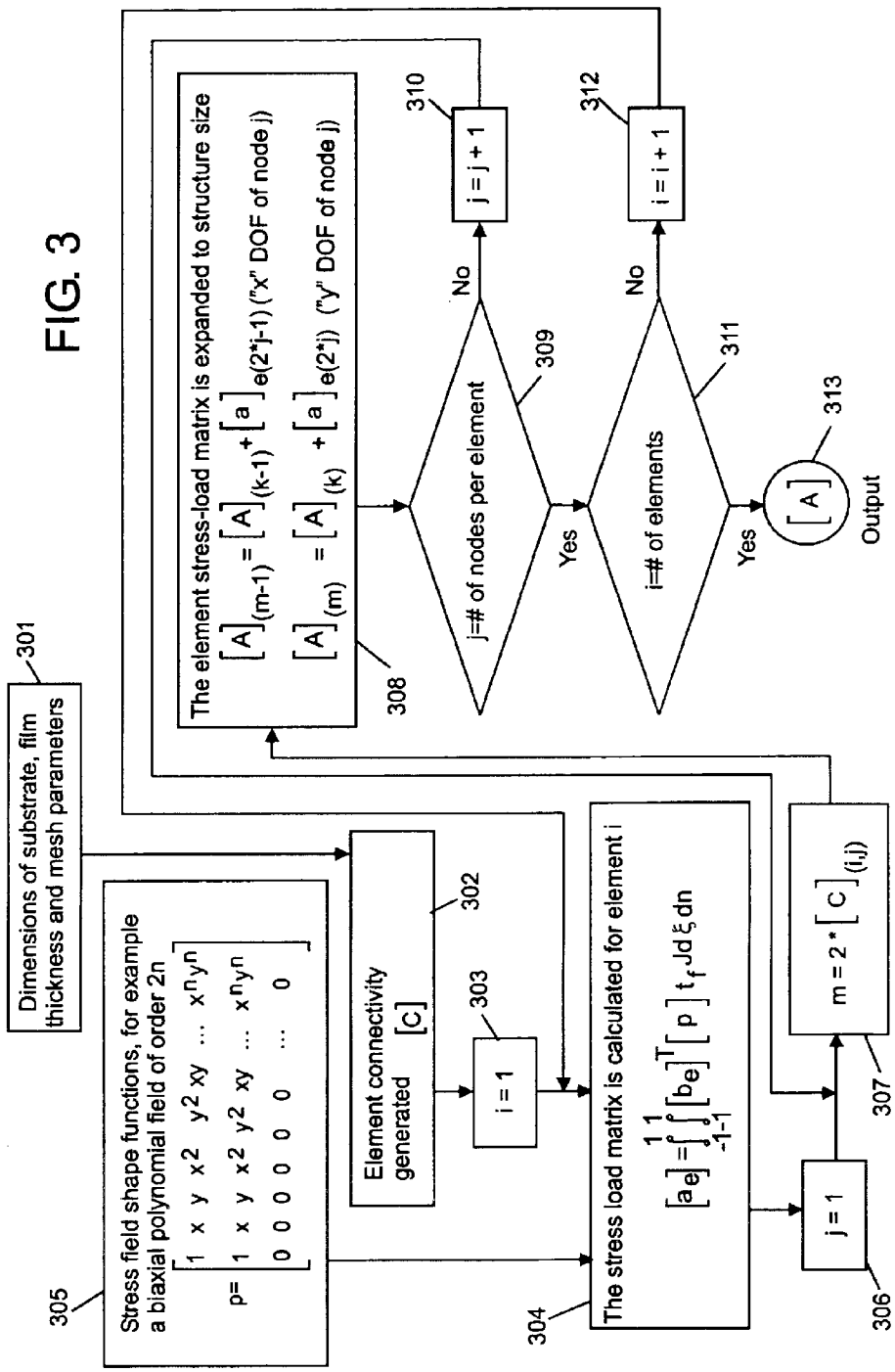
FIG. 3 is a flowchart that illustrates how the stress-load is calculated according to one embodiment of the invention.

FIG. 3 illustrates the determination of the structural stress load matrix from element stress load matrixes. The flowchart begins with the part of the process just described. Substrate dimensions, thickness and mesh parameters are used as input at 301. Element connectivity $[C]$ is generated at 302. Starting with the first element at 303, the stress-load matrix for each element is calculated 304 using the equation previously discussed, as reproduced in the flowchart. The two-dimensional polynomial field of biaxial stress is used as shown at 305 of FIG. 3. The element index i is incremented during the latter part of the process, as discussed below, and the calculation shown at 304 is repeated.

The second challenge in determining film stress from the loads calculated by the inverse computation is that only the loads on the entire film structure are known. The loading on individual elements is not known. In an initial stress displacement problem, the structural loads would be assembled from element loads. The structural inverse loads could be seen as the sum of individual inverse element loads, as shown in the equation below. However, this summation is not easy to invert, so extracting individual element loads is not a viable option.

$$\{F_{r(inv)}\} = \sum_{n}^{elements} [f_{e(inv)}]_n$$

Rather than calculating individual element loads, a structure-size stress-load matrix can be assembled, $[A]$ in the following equation, from the individual element stress-load matrices. This is achieved by adding each row of $[a_e]$ to the row of $[A]$ which corresponds to the appropriate DOF.

$$[A] = \sum_{n}^{elements} [a_e]_n$$

The latter portion of the flowchart of FIG. 3 illustrates the above process as a series of program execution steps. The index j representing the node being operated on is set at 306, and an index m is set at 307 as shown. Each element stress-load matrix is expanded as shown at step 308. At 309, a check is made to see if the last node has been operated on. If not, this index is incremented at 310. At step 311, a similar check is made for the index i for the number of elements. If there are still elements left, i is incremented at 312. If not, the process ends, and the structural stress-load is output at 313.

Once the structural stress-load matrix has been assembled, the problem of determining film stress from film load becomes the following equation, where the unknown quantity is $\{c\}$, the vector of stress coefficients.

$$\{F_{r(inv)}\} = [A]\{c\}$$

The number of columns in $[A]$ and the length of $\{c\}$ depend on the number of shape functions used to represent the film stress field. It may be desirable to limit the technique to smooth, slowly varying stress fields. If the initial stress field is assumed to be quite smooth, the number of shape functions necessary to accurately represent it are few, compared to the number of calculated forces. If this assumption is applied, the above equation is over-prescribed, and an approximate stress solution can be calculated by least squares fit, as shown by the equation below.

$$[[A]^T[A]]^{-1}[A]^T\{F_{r(inv)}\} = \{c\}$$

With the stress coefficients calculated, the approximate initial film stress can be determined by the following equation, previously discussed.

$$\sigma_0 = [p]\{c\}$$

The inverse loading is determined by the first equation, shown below, previously discussed. Combining this equation with the least squares best fit equation shown in the above paragraph gives the second equation shown below, which relates surface displacements to film stress field coefficients.

$$\{F_{r(inv)}\} = [[[K_r]^{-1}]^T[K_r]^{-1}]^{-1}[[K_r]^{-1}]^T\{x_r\}$$

$$[[A]^T[A]]^{-1}[A]^T[[[K_r]^{-1}]^T[K_r]^{-1}]^{-1}[[K_r]^{-1}]^T\{x_r\} = \{c\}$$

Rather than calculating approximate structural loads, and then calculating approximate coefficients of the film stress field as in the above equation, a single approximation can be made. The first equation below relates stress field coefficients directly to surface displacements. If the number of stress field coefficients is less than the number of surface nodes, then this problem too is over-prescribed and can be solved with the least squares approximation shown in the second equation below.

$$\{x_r\} = [K_r]^{-1}[A]\{c\}$$

$$\{c\} = [[[K_r]^{-1}[A]]^T[K_r]^{-1}[A]]^{-1}[[K_r]^{-1}[A]]^T\{x_r\}$$

Figure 4:
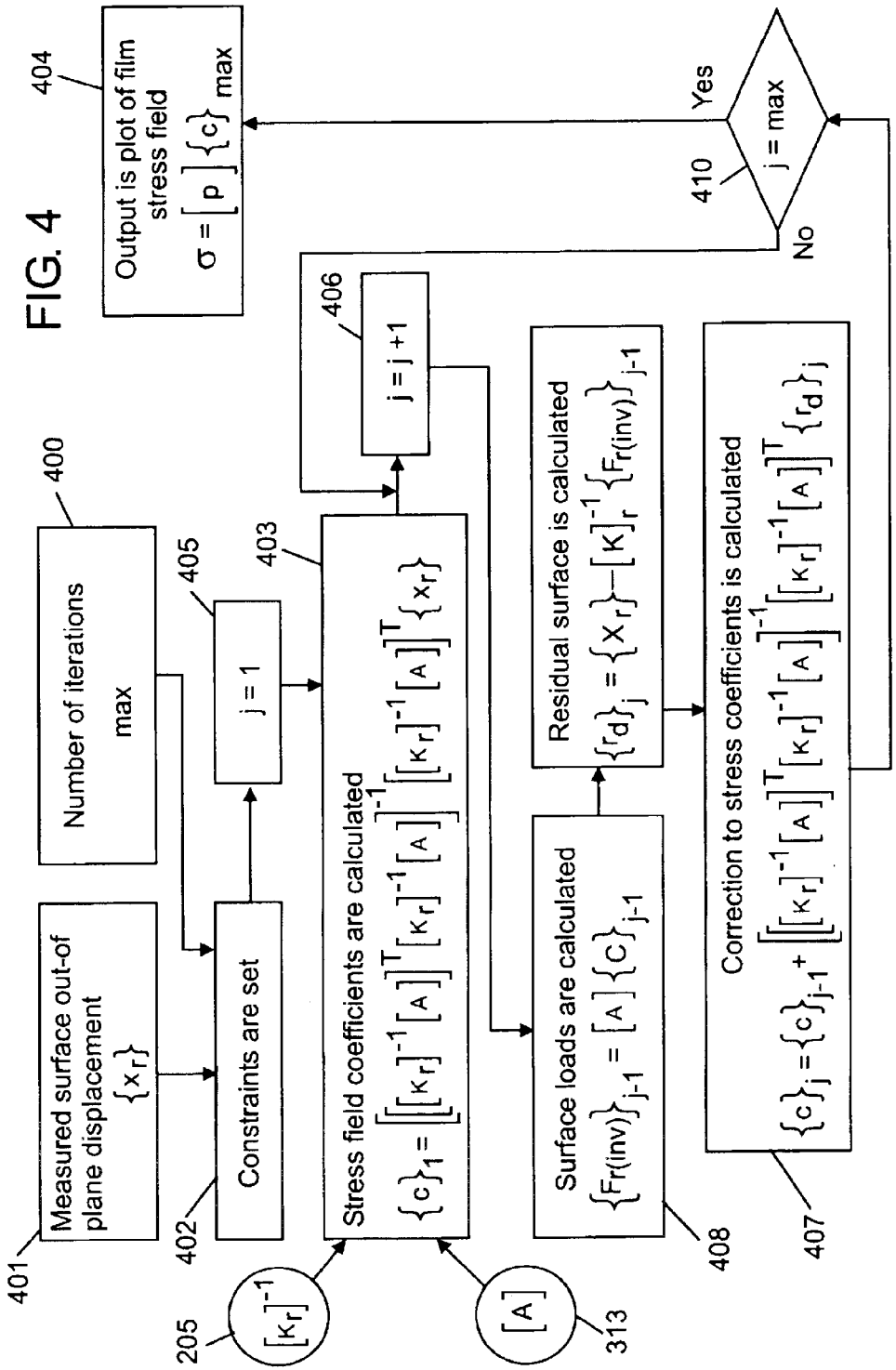
FIG. 4 is a flowchart that illustrates some embodiments of the invention.

Using either the equation immediately above, or the previous equation for $\{c\}$, the film stress can be finally determined. FIG. 4 illustrates two embodiments in a flowchart format that describes a software implementation of the technique. The measured displacement at 401 is an input. In the simplest embodiment, constraints are set at 402. The stress field coefficients are calculated at just described at step 403, using the structural compliance matrix, 205, calculated in FIG. 2 and the stress-load matrix, 313, calculated in FIG. 3. A plot of the film stress field is output at 404 according to the previously discussed equation:

$$\sigma_0 = [p]\{c\}.$$

In this case, the other steps and inputs on the flowchart are related to iteration, and do not necessarily have to be implemented. However, iterative improvements can increase the accuracy of the film stress measurements produced using the invention.

Two methods for iterative improvement are suggested by the equations presented thus far. The first step in iterative improvement of the inverse solution is computation of the residual surface. This is accomplished at each iteration by the following equation. The nodal forces calculated by the previous iteration are applied to the forward model and the calculated out-of-plane displacement at the measurement locations is extracted. These calculated displacements are subtracted from the measured displacements, producing the residual surface $\{r_d\}$.

$$\{r_d\}_j = \{x_r\} - [K]_r^{-1}\{F_{r(inv)}\}_{j-1}$$

In one method using iteration, the stress correction method, film stress is initially calculated as just described. This method is illustrated as part of FIG. 4. At step 405, index j is set to 1. At each iteration, j, is incremented as shown at 406, and a correction to the film stress is calculated by applying the equation shown at 403 to the residual surface, $\{r_d\}$, as given as shown at step 407, according to the first equation below. Again, the residual surface has been expanded to include the same displacement constraints as $\{x_r\}$. In order to calculate the residual surface, nodal loads must first be calculated. The calculation of nodal loads is accomplished at each iteration by application of the second equation shown below at step 408. The residual surface can then be calculated by the equation shown immediately above at step 409. At step 410 the process ends if j has reached the maximum number of iterations set at 400.

$$\{c\}_j = \{c\}_{j-1} + [[[K_r]^{-1}[A]]^T[K_r]^{-1}[A]]^{-1}[[K_r]^{31\ 1}[A]]^T\{r_d\}_j$$

$$\{F_{r(inv)}\}_j = [A]\{c\}_j$$

Figure 5:
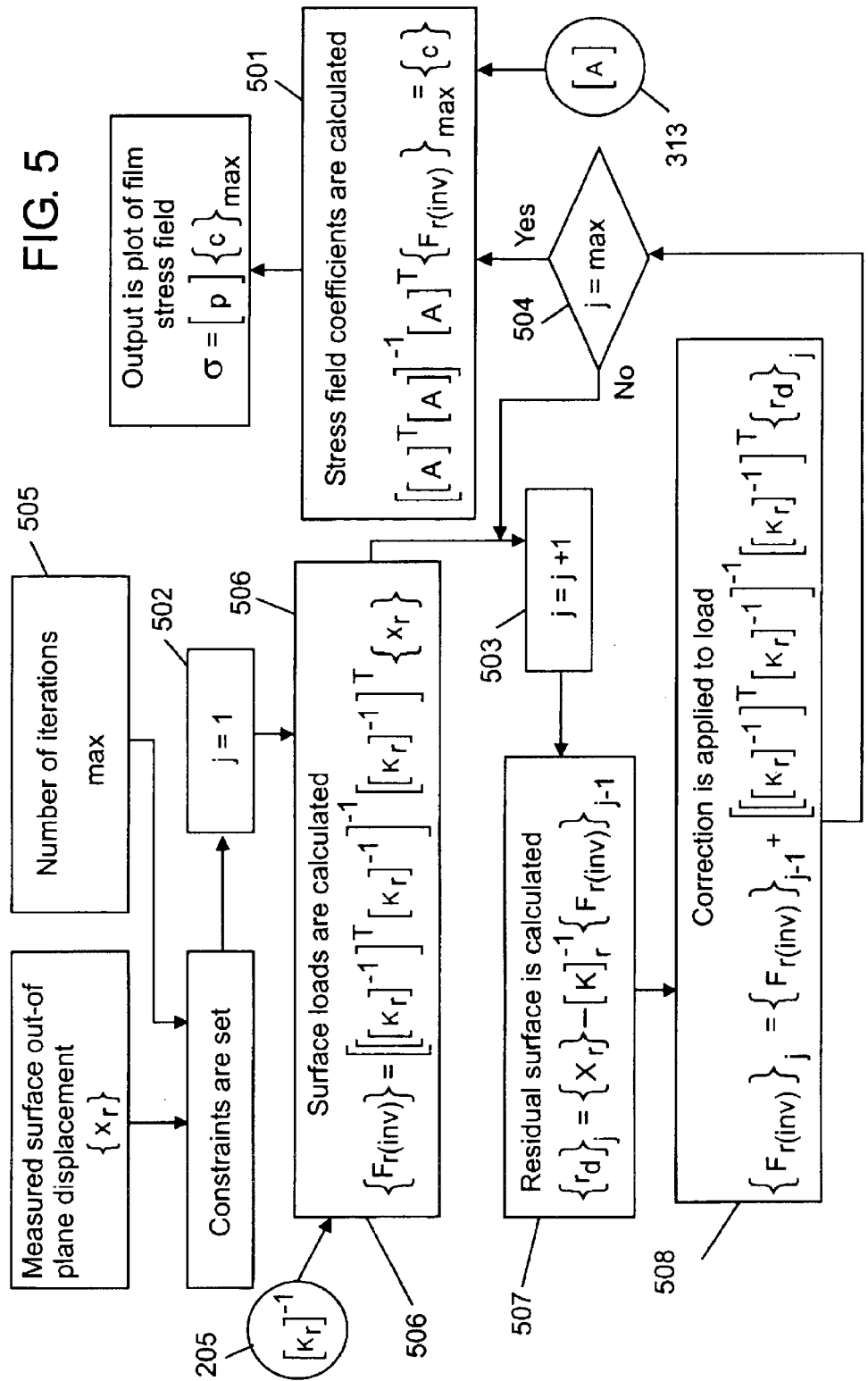
FIG. 5 is another flowchart that illustrates another embodiment of the invention.

In the other iterative method, called the force correction method, described by the flowchart in FIG. 5, film stress is calculated by this equation (previously discussed) at step 501.

$$[[A]^T[A]]^{-1}[A]^T[[[K_r]^{-1}]^T[K_r]^{-1}]^{-1}[[K_r]^{-1\ IT}\{x_r\} = \{c\}$$

However, at each iteration, j, as controlled by steps 502, 503, 504, and 505, a correction to the inverse nodal forces is calculated by applying the inverse solution to calculate surface loads as shown at step 506, to the residual surface, $\{r_d\}$, as shown at step 507. However, before the residual surface is applied it is expanded to include the same displacement constraints as $\{x_r\}$ in the equation of step 505, resulting in the correction being applied at step 508 according to the equation shown below. The input, constraint setting, and output steps are the same as in FIG. 4.

$$\{F_{r(inv)}\}_j = \{F_{r(inv)}\}_{j-1} + [[[K_r]^{-1}]^T[K_r]^{31\ 1}]^{31\ 1}[[K_r]^{31\ 1}]^T\{r_d\}_j$$

As the iterations of either method progress, the displacement solution can be seen to converge by monitoring the magnitude of the residual surface vector according to the following equation.

$$r_{d(j)}^2 = \frac{\sum_i^{DOF} (\{r_d\}_j^2)_i}{\sum_i^{DOF} \{x_r\}_i^2}$$

Figure 6:
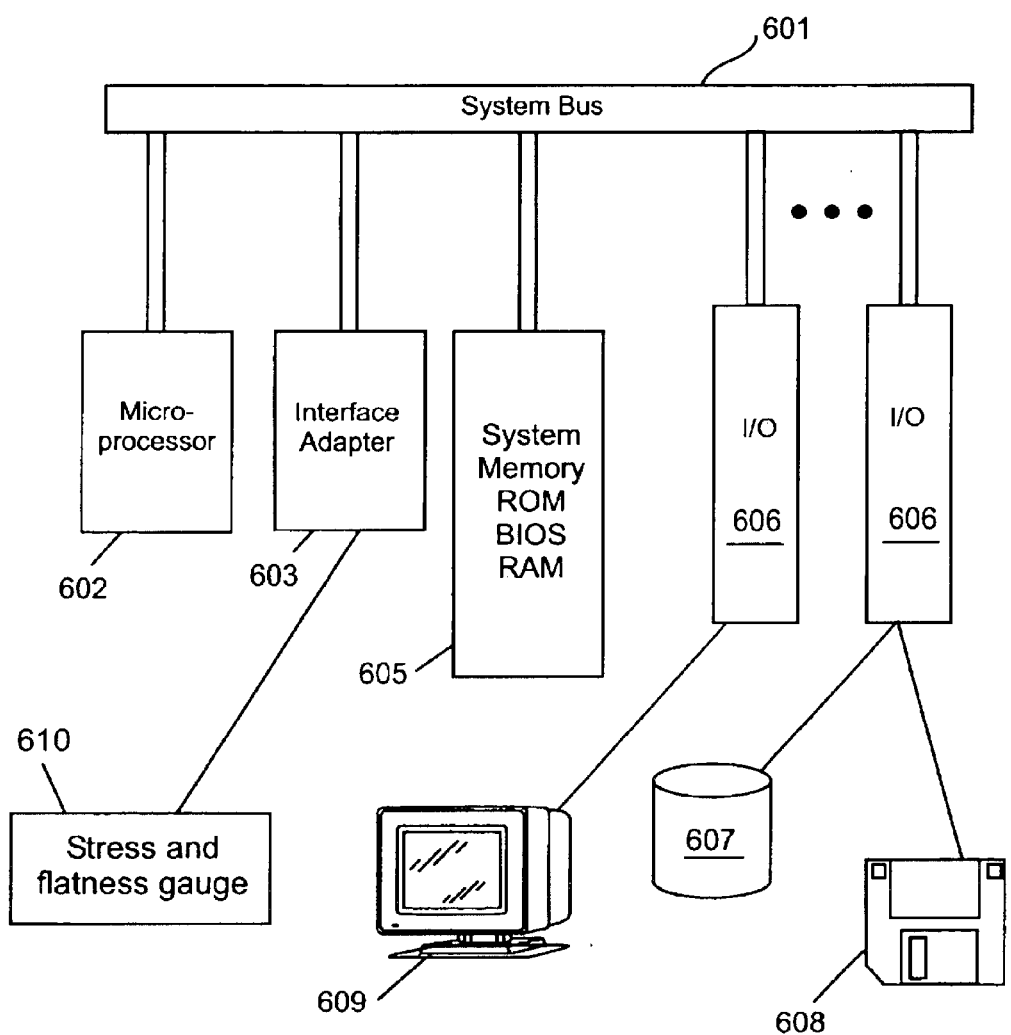
FIG. 6 is a block diagram of an example hardware system or apparatus that is used to implement the invention, namely, a stress and flatness gauge connected to a computer system.

As previously discussed, in some embodiments, the invention in implemented through software operating on a programmable computer system or program execution system such as a personal computer or workstation, or other microprocessor-based platform. The program execution system is interfaced to a measurement system such as a laser scanning stress and flatness gauge. FIG. 6 illustrates further detail of a computer system that is implementing the invention in this way. System bus 601 interconnects the major components. The system is controlled by microprocessor 602, which serves as the central processing unit (CPU) for the system. System memory 605 is typically divided into multiple types of memory or memory areas such as read-only memory (ROM), random-access memory (RAM) and others. The system memory may also contain a basic input/output system (BIOS). A plurality of general input/output (I/O) adapters or devices, 606, are present. Only two are shown for clarity. These connect to various devices including a fixed disk drive, 607, a diskette drive, 608, and a display, 609. The display shows stress maps or other forms of stress measurements produced through the use of the invention. Computer program instructions for implementing the functions of the invention are stored on the fixed disk, 607. When the system is operating, the instructions are partially loaded into memory, 605 and executed by microprocessor 602. The system optionally includes another I/O device, an interface adapter or circuitry, shown at 603, for connection to the stress and flatness gauge, 610. Examples of possible interfaces include well-known standards such as Ethernet, RS-232, IEEE-1394, USB, or a non-standard interface specifically designed for this application. It should be noted that the system of FIG. 6 is meant as an illustrative example only. Numerous types of general-purpose computer systems are available and can be used. Available systems include those that run operating systems such as Windows™ by Microsoft and various versions of Unix. As previously mentioned, the program execution system and measurement system can also be combined in one unit.

Elements of the invention may be embodied in hardware and/or software as computer program code (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system such as that shown in FIG. 6. Such mediums are illustrated graphically in FIG. 6 to represent, for example, the diskette drive. A computer-usable or computer-readable medium may be any medium that can contain, store, communicate, or transport the program for use by or in connection with an instruction execution system. The computer-usable or computer-readable medium, for example, an electronic, magnetic, optical, electromagnetic, infrared, or semiconductor system. Note that the computer-usable or computer-readable medium could even be paper or another suitable medium upon which a program is printed. Computer program code can also be accessed or "downloaded" through a network such as the Internet.

Specific embodiments of an invention are described herein. One of ordinary skill in the semiconductor and computing arts will quickly recognize that the invention has other applications in other environments. In fact, many embodiments and implementations are possible. The following claims are in no way intended to limit the scope of the invention to the specific embodiments described above.

I claim:

1. A method of producing a stress measurement for a film applied to a substrate having known dimensions and known structural properties, the method comprising:

measuring surface displacement of the substrate;

determining structural compliance based on an inverse finite element model of the substrate, and a structural stress-load using the known dimensions and known structural properties of the substrate;

calculating a stress field using the structural compliance, the structural stress-load, and the surface displacement of the substrate; and outputting the stress measurement based on values in the stress field.

2. The method of claim 1 wherein the determining of the structural compliance further comprises:

calculating a stiffness matrix;

inverting the stiffness matrix; and removing columns corresponding to unloaded degrees of freedom and rows corresponding to unprescribed displacements.

3. The method of claim 1 wherein the determining of the structural stress-load further comprises calculating element-by-element stress-loads and expanding the element-by-element stress-loads to determine the structural stress-load.

4. The method of claim 2 wherein the determining of the structural stress-load further comprises calculating element-by-element stress-loads and expanding the element-by-element stress-loads to determine the structural stress-load.

5. A method of producing a stress measurement for a film applied to a substrate having known dimensions and known structural properties, the method comprising:

measuring surface displacement of the substrate;

determining structural compliance based on an inverse finite element model of the substrate, and a structural stress-load using the known dimensions and known structural properties of the substrate;

calculating an initial stress field using the structural compliance, the structural stress-load, and the surface displacement of the substrate;

iteratively correcting coefficients in the initial stress field to arrive at a structural stress field; and outputting the stress measurement based on values in the structural stress field.

6. The method of claim 5 wherein iteratively correcting coefficients further comprises, for each iteration, determining a residual surface after calculating nodal surface loads.

7. The method of claim 5 wherein the determining of the structural compliance further comprises:

calculating a stiffness matrix;

inverting the stiffness matrix; and removing columns corresponding to unloaded degrees of freedom and rows corresponding to unprescribed displacements.

8. The method of claim 6 wherein the determining of the structural compliance further comprises:

calculating a stiffness matrix;

inverting the stiffness matrix; and removing columns corresponding to unloaded degrees of freedom and rows corresponding to unprescribed displacements.

9. The method of claim 5 wherein the determining of the structural stress-load further comprises calculating element-by-element stress-loads and expanding the element-by-element stress-loads to determine the structural stress-load.

10. The method of claim 6 wherein the determining of the structural stress-load further comprises calculating element-by-element stress-loads and expanding the element-by-element stress-loads to determine the structural stress-load.

11. A method of producing a stress measurement for a film applied to a substrate having known dimensions and known structural properties, the method comprising:

measuring surface displacement of the substrate;

determining structural compliance based on an inverse finite element model of the substrate, and a structural stress-load using the known dimensions and known structural properties of the substrate;

calculating initial surface loads based on the structural compliance;

iteratively correcting the initial surface loads to arrive at a final surface load by determining, for each iteration, a residual surface;

calculating a stress field using the structural stress-load and the final surface loads; and outputting the stress measurement based on values in the stress field.

12. The method of claim 11 wherein the determining of the structural compliance further comprises:

calculating a stiffness;

inverting the stiffness matrix; and removing columns corresponding to unloaded degrees of freedom and rows corresponding to unprescribed displacements.

13. The method of claim 11 wherein the determining of the stress-load further comprises calculating element-by-element stress-loads and expanding the element-by-element stress-loads to determine the structural stress-load.

14. The method of claim 12 wherein the determining of the stress-load further comprises calculating element-by-element stress-loads and expanding the element-by-element stress-loads to determine the structural stress-load.

15. A computer program product including a computer usable medium having a computer program embodied thereon, the computer program for producing a stress measurement for a film applied to a substrate having known dimensions and known structural properties, the computer program comprising:

instructions for causing a measuring device to measure surface displacement of the substrate;

instructions for determining structural compliance based on an inverse finite element model of the substrate, and a structural stress-load using the known dimensions and known structural properties of the substrate;

instructions for calculating a stress field using the structural compliance, the stress-load, and the surface displacement of the substrate; and instructions for displaying the stress measurement based on values in the stress field.

16. The computer program product of claim 15 wherein the instructions for determining of the structural compliance further comprise:

instructions for calculating a stiffness matrix; and instructions for inverting the stiffness matrix; and instructions for removing columns corresponding to unloaded degrees of freedom and rows corresponding to unprescribed displacements.

17. The computer program product of claim 15 wherein the instructions for determining the structural stress-load further comprise:

instructions for calculating element-by-element stress-loads; and instructions for expanding the element-by-element stress-loads to determine the structural stress load.

18. The computer program product of claim 16 wherein the instructions for determining the structural stress-load further comprise:

instructions for calculating element-by-element stress-loads; and instructions for expanding the element-by-element stress-loads to determine the structural stress load.

19. A computer program product including a computer usable medium having a computer program embodied thereon, the computer program for producing a stress measurement for a film applied to a substrate having known dimensions and known structural properties, the computer program comprising:

instructions for causing a measuring device to measure surface displacement of the substrate;

instructions for determining structural compliance based on an inverse finite element model of the substrate, and a structural stress-load using the known dimensions and known structural properties of the substrate;

instructions for calculating an initial stress field using the structural compliance, the structural stress-load, and the surface displacement of the substrate;

instructions for iteratively correcting coefficients in the initial stress field to arrive at a structural stress field; and instructions for displaying the stress measurement based on values in the structural stress field.

20. The computer program product of claim 19 wherein the instructions for iteratively correcting coefficients, for each iteration, determine a residual surface after calculating nodal surface loads.

21. The computer program product of claim 19 wherein the instructions for determining the structural compliance further comprise:

instructions for calculating a stiffness matrix;

instructions for inverting the stiffness matrix; and instructions for removing columns corresponding to unloaded degrees of freedom and rows corresponding to unprescribed displacements.

22. The computer program product of claim 20 wherein the instructions for determining the structural compliance further comprise:

instructions for calculating a stiffness matrix;

instructions for inverting the stiffness matrix; and instructions for removing columns corresponding to unloaded degrees of freedom and rows corresponding to unprescribed displacements.

23. The computer program product of claim 19 wherein the instructions for determining the structural stress-load further comprise:

instructions for calculating element-by-element stress-loads; and instructions for expanding the element-by-element stress-loads to determine the structural stress-load.

24. The computer program product of claim 20 wherein the instructions for determining the structural stress-load further comprise:

instructions for calculating element-by-element stress-loads; and instructions for expanding the element-by-element stress-loads to determine the structural stress-load.

25. A computer program product including a computer usable medium having a computer program embodied thereon, the computer program for producing a stress measurement for a film applied to a substrate having known dimensions and known structural properties, the computer program comprising:

instructions for causing a measuring device to measure surface displacement of the substrate;

instructions for determining structural compliance based on an inverse finite element model of the substrate, and a structural stress-load using the known dimensions and known structural properties of the substrate;

instructions for calculating initial surface loads based on the structural compliance;

instructions for iteratively correcting the initial surface loads to arrive at a final surface load by determining, for each iteration, a residual surface;

instructions for calculating a stress field using the stress-load, and the final surface loads; and instructions for displaying the stress measurement based on values in the stress field.

26. The computer program product of claim 25 wherein the instructions for determining the structural compliance further comprise:

instructions for calculating a stiffness matrix;

instructions for inverting the stiffness matrix; and instructions for removing columns corresponding to unloaded degrees of freedom and rows corresponding to unprescribed displacements.

27. The computer program product of claim 25 wherein the instructions for determining the structural stress-load further comprise:

instructions for calculating element-by-element stress-loads; and instructions for expanding the element-by-element stress-loads to determine the structural stress-load.

28. The computer program product of claim 26 wherein the instructions for determining the structural stress-load further comprise:

instructions for calculating element-by-element stress-loads; and instructions for expanding the element-by-element stress-loads to determine the structural stress-load.

29. A system for producing a stress measurement for a film applied to a substrate having known dimensions and known structural properties, the system comprising:

means for measuring surface displacement of the substrate;

means for determining structural compliance based on an inverse finite element model of the substrate, and a structural stress-load using the known dimensions and known structural properties of the substrate;

means for calculating a structural stress field using the structural compliance, the stress-load, and the surface displacement of the substrate; and means for displaying the stress measurement based on values in the stress field.

30. The system of claim 29 wherein the means for calculating the structural stress field further comprises:

means for calculating an initial stress field using the structural compliance, the structural stress-load, and the surface displacement of the substrate; and means for iteratively correcting coefficients in the initial stress field to arrive at the structural stress field.

31. The system of claim 29 wherein the means for calculating the structural stress field further comprises:

means for calculating initial surface loads based on the structural compliance;

means for iteratively correcting the initial surface loads to arrive at a final surface load by determining, for each iteration, a residual surface; and means for calculating the structural stress field using the structural stress-load, and the final surface loads.

32. Apparatus for producing a stress measurement for a film applied to a substrate having known dimensions and known structural properties, the apparatus comprising:

a measurement system operable to measure surface displacement of the substrate; and a program execution system operatively interfaced to the measurement system, the program execution system operable to control the measurement system and determine the surface displacement measured by the measurement system, the program execution system further operable to calculate a structural stress field using structural compliance determined by an inverse finite element model of the substrate, a structural stress-load, and the surface displacement, and further operable to display the stress measurement based on values in the structural stress field.

33. The apparatus of claim 32 wherein the program execution system calculates the structural stress field by performing a method comprising:

calculating an initial stress field using the structural compliance, the structural stress-load, and the surface displacement of the substrate; and iteratively correcting coefficients in the initial stress field to arrive at the structural stress field.

34. The apparatus of claim 32 wherein the program execution system calculates the structural stress field matrix by performing a method comprising:

calculating initial surface loads based on the structural compliance;

iteratively correcting the initial surface loads to arrive at a final surface load by determining, for each iteration, a residual surface; and calculating the structural stress field using the structural stress-load and the final surface loads.

35. The apparatus of claim 32 wherein the structural compliance is determined by performing a method comprising:

calculating a stiffness matrix;

inverting the stiffness matrix; and removing columns corresponding to unloaded degrees of freedom and rows corresponding to unprescribed displacements.

36. The apparatus of claim 33 wherein the structural compliance is determined by performing a method comprising:

calculating a stiffness matrix;

inverting the stiffness matrix; and removing columns corresponding to unloaded degrees of freedom and rows corresponding to unprescribed displacements.

37. The apparatus of claim 34 wherein the structural compliance is determined by performing a method comprising:

calculating a stiffness matrix;

inverting the stiffness matrix; and removing columns corresponding to unloaded degrees of freedom and rows corresponding to unprescribed displacements.

38. The apparatus of claim 32 wherein the structural stress-load is based on known dimensions and structural properties of the substrate and is determined by calculating element-by-element stress-loads and expanding the element-by-element stress-loads to determine the structural stress-load.

39. The apparatus of claim 33 wherein the structural stress-load is based on known dimensions and structural properties of the substrate and is determined by calculating element-by-element stress-loads and expanding the element-by-element stress-loads to determine the structural stress-load.

40. The apparatus of claim 34 wherein the structural stress-load is based on known dimensions and structural properties of the substrate and is determined by calculating element-by-element stress-loads and expanding the element-by-element stress-loads to determine the structural stress-load.

41. The apparatus of claim 35 wherein the structural stress-load is based on known dimensions and structural properties of the substrate and is determined by calculating element-by-element stress-loads and expanding the element-by-element stress-loads to determine the structural stress-load.

42. The apparatus of claim 36 wherein the structural stress-load is based on known dimensions and structural properties of the substrate and is determined by calculating element-by-element stress-loads and expanding the element-by-element stress-loads to determine the structural stress-load.

43. The apparatus of claim 37 wherein the structural stress-load is based on known dimensions and structural properties of the substrate and is determined by calculating element-by-element stress-loads and expanding the element-by-element stress-loads to determine the structural stress-load.

* * * * *